United States Patent
Hämmerle et al.

(10) Patent No.: US 11,064,312 B2
(45) Date of Patent: Jul. 13, 2021

(54) SHOPPING TROLLEY SECURITY SYSTEM

(71) Applicant: Wanzl GmbH & Co. KGaA, Leipheim (DE)

(72) Inventors: Jürgen Hämmerle, Günzburg (DE); Peter Kowal, Günzburg (DE)

(73) Assignee: WANZL GMBH & CO. KGAA, Leipheim (DE)

( * ) Notice: Subject to any disclaimer, the term of this patent is extended or adjusted under 35 U.S.C. 154(b) by 0 days.

(21) Appl. No.: 16/474,538

(22) PCT Filed: Jan. 11, 2018

(86) PCT No.: PCT/EP2018/050667
§ 371 (c)(1),
(2) Date: Jun. 27, 2019

(87) PCT Pub. No.: WO2018/141526
PCT Pub. Date: Aug. 9, 2018

(65) Prior Publication Data
US 2020/0029166 A1    Jan. 23, 2020

(30) Foreign Application Priority Data
Feb. 6, 2017   (DE) ...................... 10 2017 102 285.6

(51) Int. Cl.
| | |
|---|---|
| *H04W 4/021* | (2018.01) |
| *G06K 19/07* | (2006.01) |
| *H04W 4/80* | (2018.01) |
| *H04W 4/33* | (2018.01) |

(52) U.S. Cl.
CPC ........ *H04W 4/021* (2013.01); *G06K 19/0723* (2013.01); *H04W 4/33* (2018.02); *H04W 4/80* (2018.02)

(58) Field of Classification Search
CPC ....... H04W 4/021; H04W 4/025; H04W 4/33; H04W 4/80; H04W 24/00; H04W 24/06; G06K 19/0723
USPC ........................................................ 370/252
See application file for complete search history.

(56) References Cited

U.S. PATENT DOCUMENTS

| | | | |
|---|---|---|---|
| 2008/0042836 A1 | 2/2008 | Christopher | |
| 2012/0158297 A1 | 6/2012 | Kim et al. | |
| 2014/0001258 A1* | 1/2014 | Chan | G06Q 10/0875 |
| | | | 235/385 |
| 2014/0343846 A1* | 11/2014 | Goldman | G01C 21/165 |
| | | | 701/525 |

(Continued)

FOREIGN PATENT DOCUMENTS

| | | |
|---|---|---|
| DE | 102008041274 A1 | 3/2009 |
| KR | 20130078276 A | 7/2013 |
| WO | 2010099771 A2 | 9/2010 |

OTHER PUBLICATIONS

ISA European Patent Office, International Search Report Issued in Application No. PCT/EP2018/050667, dated Feb. 23, 2018, WIPO, 4 pages.

*Primary Examiner* — Candal Elpenord
(74) *Attorney, Agent, or Firm* — McCoy Russell LLP

(57) ABSTRACT

The invention relates to an operating state measuring system, to a server, and to a method for controlling the operating state measuring system, comprising the following method steps: receiving a data packet from a receiving unit; receiving a position signal; evaluating the received data; and generating a result data set from the evaluated data.

20 Claims, 2 Drawing Sheets

(56) References Cited

U.S. PATENT DOCUMENTS

| | | | |
|---|---|---|---|
| 2015/0153443 A1* | 6/2015 | Van Taunay | G01S 1/0428 |
| | | | 702/150 |
| 2016/0026837 A1* | 1/2016 | Good | G06Q 50/22 |
| | | | 340/539.13 |
| 2016/0027091 A1* | 1/2016 | McGrath | G06Q 30/0633 |
| | | | 705/26.8 |
| 2018/0114250 A1* | 4/2018 | Phillips | G06Q 30/0261 |
| 2019/0179003 A1* | 6/2019 | Trivelpiece | G01S 13/75 |

* cited by examiner

SHOPPING TROLLEY SECURITY SYSTEM

CROSS-REFERENCE TO RELATED APPLICATIONS

The present application is a U.S. National Phase of International Patent Application Serial No. PCT/EP2018/050667 entitled "SHOPPING TROLLEY SECURITY SYSTEM," filed on Jan. 11, 2018. International Patent Application Serial No. PCT/EP2018/050667 claims priority to German Patent Application No. 10 2017 102 285.6 filed on Feb. 6, 2017. The entire contents of each of the above-referenced applications are hereby incorporated by reference for all purposes.

TECHNICAL FIELD

The invention resides in the field of shopping cart logistics, electronics and network technology and relates, in particular, to an operating state measuring system for transport units, such as shopping carts in particular, which are used in a supermarket in various operating areas and kept available in parking boxes.

BACKGROUND AND SUMMARY

In the prior art, shopping carts are stored in a storage area, so-called parking boxes, where these may be removed by the customer for shopping.

Existing shopping carts comprise mechanical components for transporting the products to be purchased. So far, no electronic components have been provided.

There is a need, however, in practice for digitized systems. It is known for this purpose to equip shopping carts with electronic components so as to be able to detect and evaluate digital data.

EP 2 391 247 B1 and DE 10 2008 041 274 A1, for example, show examples for providing electronic labels or RFID tags on the shopping cart so as to secure the same against theft, for example.

The evaluation can take place in the cloud, which is to say on a server connected via a network. In practice, however, it is becoming evident that data is being increasingly relocated to the cloud, a process during which errors can also occur. In particular, errors and failures in the detection of data can result in serious faulty evaluations.

Proceeding from the known prior art, it is the object of the present invention to enhance the failsafe operation and reliability of systems using electronic data detection, and to make these more failsafe overall.

This object is achieved by the respective subject matter of the accompanying independent claims, and in particular by an operating state measuring system, a use of this system, a server for controlling the same, and by a method. Advantageous embodiments are the subject matter of the dependent claims, the description and the drawings.

According to a first aspect of the invention, the object is achieved by an operating state measuring system for a plurality of transport units, and in particular of shopping carts, that are moved in different operating areas. The shopping carts are stored in parking boxes.

The operating state measuring system comprises:

a plurality of transport units for use by a user and each comprising an electronic transmitting unit;

at least one receiving unit, which is positioned in all or selected operating areas and designed to receive signals from the electronic transmitter and to send a data package to the central server;

a plurality of beacons, which are positioned in all or selected operating areas;

an application, which is installed on a mobile device of the user and intended to receive a bijective identification signal from a beacon, if the mobile device is located in the surroundings of the beacon, so as to then prompt the transmission of a position signal to a central server; and the central server, which is intended to receive and to evaluate the data package from the receiving unit and the position signal for the calculation of a result data set.

In other words, the solution relates to the redundant provision of localization data of the shopping cart during operation and of the mobile device of the customer as a user of the application and of the shopping cart. In this way, it advantageously becomes possible for the detected data sets to be compared and verified. The security of the system can thus be enhanced.

According to a preferred embodiment of the method, all or selected shopping carts of the fleet of shopping carts of a market are designed with an RFID tag (transponder) serving as an electronic transmitting unit. The RFID tag exchanges data with an RFID reader from a group of RFID readers, which are positioned as the receiving unit in different positions within the market, such as at least on the parking box for the shopping carts or in the entrance and exit regions of the market. The RFID tag transmits a bijective, identifying code to the RFID reader. The RFID reader receives this code, or reads out the code, and transmits detected and collected position data, together with an association with the tag identifying the respective shopping cart, to a calculation unit, which can be designed as a central server, for example. The RFID transmitter-receiver system is used to automatically and in a contactless manner identify and localize the shopping carts in the market using radio waves. Reference is made to ISO standard 18000-1 et seq. for the data transfer between the tag and the reader. In an embodiment of the invention, it may be provided that the reading device (reader) is also able to write data. The reader generates a high frequency electromagnetic alternating field, to which the RFID tag is exposed. The high frequency energy taken up by the tag via an antenna can be used during the communication process to supply power to the chip thereof. For active tags, an installed battery can also be used for the energy supply. In the case of semi-active tags, the battery only supplies power to the microchip. The microchip thus activated in the RFID tag decodes the commands sent by the reader. The RFID tag encodes and modulates the response into the irradiated electromagnetic field through field weakening in the contact-free short circuit or out-of-phase reflection of the field emitted by the reader. With this, the tag transmits the invariable serial number thereof or the code identifying the tag and, if necessary, additional data polled by the reading device or reader to the reader. The tag itself thus does not generate a field, but influences the electromagnetic transmission field of the reader. So as to achieve greater ranges, it is also possible to use active transponders having a dedicated power supply unit. In general, the reader has software (such as a microprogram) installed thereon, controlling the actual read process, as well as RFID middleware including interfaces to further systems, to a database and to the server.

In an alternative embodiment of the invention, it is also possible to use a different technology than RFID technology, having an appropriate transmission protocol, for the contactless exchange of data, such as bar code-based or image scan-based methods.

In a preferred embodiment of the invention, the beacon transmits the bijective identification signal via a radio link, and in particular via Bluetooth or WLAN. The bijective identification signal is preferably sent to the application, which is installed on a mobile device that the user carries with him or her during shopping. However, the application can also be installed on another device. In this case, the position signal would be sent by this other device to the server.

In a further advantageous embodiment of the invention, multiple parking boxes for storing the transport units are located in different operating areas of the supermarket. The operating areas may be located on different levels. Advantageously, in this embodiment of the invention, the signals provided by the RFID receiving unit provide not only the X and Y coordinates, but also Z coordinates, so that a spatial resolution across the levels is possible as well, and so that it is possible to evaluate how many shopping carts are present in the particular operating area. For example, an operating area may relate to a certain range of products, a function (banking service and the like), or a specific shop in a shop-in-shop system. In this way, improved logistics can be provided across the collectivity of all operating areas.

In a further advantageous embodiment of the invention, it is possible that not only the operating areas, but also the parking boxes are located on different levels of the supermarket. The electronic system, and in particular the RFID system, is intended to detect and forward x, y and z coordinates for this purpose.

The operating state measuring system can preferably be used to measure a transport unit density in each of the operating areas and, in particular, to measure a supply level of a respective parking box. The "supply level" shall be understood to mean how many shopping carts are present in the parking box. Since all supply levels across the entire market can be ascertained, it is also possible to evaluate on the central server which parking boxes are overstocked and which are understocked, so as to be able to initiate appropriate logistics measures. The measurement of the transport density, however, can relate not only to the parking boxes, but also the cash register area in front of each individual register, for example. A signal can be automatically detected, for example, which indicates that another cash register is to be opened or a cash register can be closed. It is also possible to analyze operating areas having a particular range of products, whereby an analytical tool is provided to the supermarket so as to detect how long how many customers are located in front of a particular range of products of a sales area.

According to a further aspect, the invention relates to a server, which is intended to control an operating state measuring system. The server comprises:

an input interface, which is intended to receive data packets from a receiving unit and position signals. The position signals can be transmitted by an application of the customer.

a processor, which is intended to evaluate the received data and to generate a result data set; and an output interface, which is used to output or forward the result data set.

According to a further aspect, the invention relates to a method for controlling an operating state measuring system, comprising the following method steps, which are carried out on the server:

receiving a data packet from a receiving unit;
receiving a position signal;
evaluating the received data; and generating a result data set from the evaluated data.

In an advantageous embodiment of the invention, the transmission of the data packet from the receiving unit to the server is carried out in a time-controlled mode. For this purpose, in particular, the data to be transmitted can be aggregated so as to then be transmitted collectively to the server in a preconfigurable time period.

In a further advantageous embodiment of the invention, the evaluation includes a detection of the residence time of a transport unit in the various operating areas.

In a further advantageous embodiment of the invention, only prefiltered data packets are sent to the server, in particular a validity value, a time stamp and a revision data set, which only includes revisions compared to previously transmitted data. In this way, the volume of data to be transmitted can be considerably reduced.

In a further advantageous embodiment of the invention, the result data set is prepared for output on a graphical user interface and/or on a mobile device and is transmitted thereto. In this way, an evaluation of the detected data can be provided on a computer of the server or on a mobile device. The data can be graphically displayed.

In a further advantageous embodiment of the invention, the evaluation includes a data comparison between the respective received data packet and the position signal. This is an important feature and aimed at the reliability of the detected and evaluated data. In this way, it can be ensured that the analysis is always only carried out when the data packet and the position data correspond to one another. This is the case when the position data of the shopping cart approximately agrees with the position data of the customer. In the event of deviations, further calculations can be carried out, for example so as to ascertain in which operating areas deviations occur between the two position data. Additionally, the respective other signal can be resorted to for evaluation in the event of a failure or an error of one of the two position data detection systems (RFID signal and beacon signal), given the redundant data detection.

In a further advantageous embodiment of the invention, the evaluation includes an association between the respective transport unit and the application of the user or of the customer operating the transport unit. This enables a more detailed breakdown of the data.

Further details of the invention and, in particular, exemplary embodiments of the machine or automated system according to the invention will be described hereafter based on the accompanying drawings.

In the drawings:

DETAILED DESCRIPTION

Figure 1:
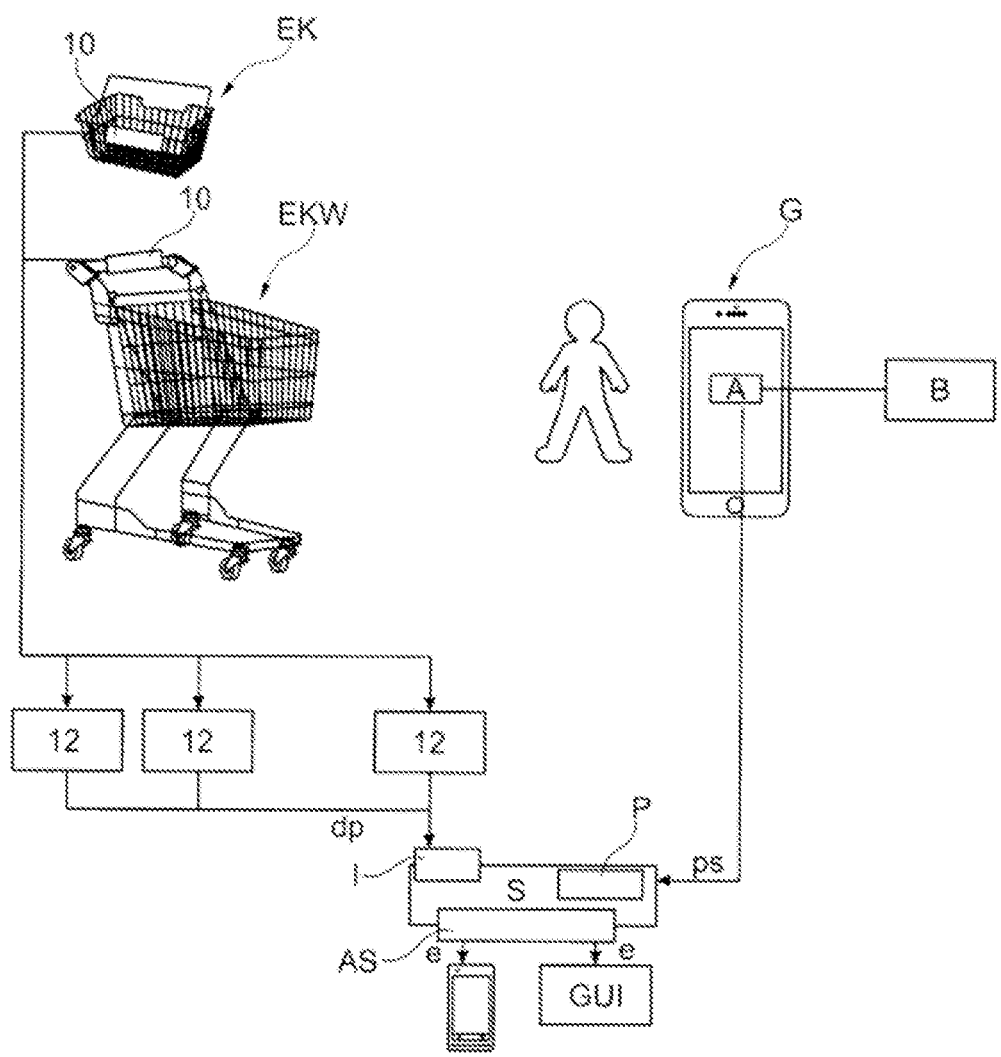
FIG. 1 shows a schematic overview representation of an operating state measuring system based on an exemplary embodiment.

FIG. 1 shows a schematic overview representation of an operating state measuring system according to an exemplary embodiment of the present invention.

The transport units, encompassing shopping carts EKW or shopping baskets EK or other movable transport means, are provided by a supermarket and stored in one or more parking boxes. From there, they may be removed by the customer.

During shopping, the shopping carts EKW are moved through various operating areas of the supermarket (parking box, entrance region, various sales areas, and exit region and the like). The operating areas can be located on different levels.

A respective electronic transmitting 10 is attached to all or selected transport units EKW, EK. The transmitting unit is preferably designed as an RFID tag. This is non-detachably secured to the shopping cart EKW.

When the shopping cart, together with the electronic transmitting 10, is moved into the region of a receiving unit 12, which accordingly is designed as an RFID reader, at least x and y coordinates are detected for the respective shopping cart EKW. The RFID reader creates a data packet dp. The data packet dp includes configurable data sets and at least one association between position-based data and data identifying the respective shopping cart EKW. The data packet is forwarded to a central server S.

The X-Y coordinates, and in one refinement additionally the Z coordinates, of the tagged shopping carts EKW can be detected with a certain level of accuracy (approximately +/− 60 cm) by way of the RFID reader (or a plurality thereof). The server S can then be designed to record the walking profile of the customer and to output this as part of the result data set e on a graphical user interface GUI or on a mobile or stationary device.

In a preferred embodiment of the invention, beacons B are positioned in different positions within the supermarket. These may be designed as small electronic units or as beacons and intended to transmit bijective identification data via a radio link (such as Bluetooth or WLAN and the like) to an application A installed on a mobile device G of the user according to a certain transmission protocol. A push protocol or a pop protocol can be used for this purpose, in which the data is actively sent by the beacon as the data arises, or is passively requested by the application A. The application A is then designed to generate a position signal from the received identification data. As an alternative, still further metadata may be sent to the central server together with the generated position signal.

A processor P on the server S is used to process the detected data. The data is read in via an input interface I. FIG. 1 shows the input interface only once for the sake of clarity. The data packet is read in via this input interface I. However, the input interface I also includes a section for detecting the position signal ps. Different calculations are then applied from the detected data dp, ps so as to generate a result data set e, which can be forwarded via an output interface A [; AS] to output devices. Advantageously, the calculations can be configured in advance in a configuration step.

Figure 2:
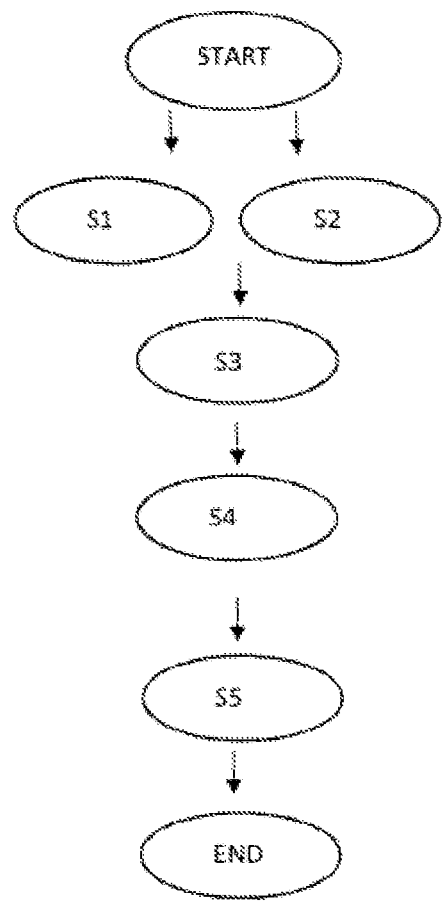
FIG. 2 shows a flow chart of the method according to an advantageous embodiment of the invention.

FIG. 2 shows a flow chart of a preferred embodiment of the invention. After the system has been started, the data packet db is received from the receiving unit 12 (RFID reader) in step S1. In step S2, the position signal ps is received. As is indicated in FIG. 2, the order of the steps of receiving S1, S2 is not established, and these may also be carried out parallel to or overlapping with one another. After the data has been completely received, this can be evaluated in step S3 on the processor P of the server S. A comparison of the two received data dp, ps is preferably carried out in the process. This step is used to increase the reliability of the data evaluation.

In a preferred embodiment of the invention, it is provided that the customer can receive market-specific offers, in the form of a push message, on the mobile device on which the application A is installed when entering a specific market, after having exchanged authentication data or logged on. Moreover, the customer can create a market-specific shopping list. As a result of the connection to the server S, it can then be indicated to the customer on the mobile device G where or in what operating area the products from his or her shopping list can be found.

The data transmitted from the RFID reader 12 and/or from the application A can be enriched with metadata, which, for example, also includes a time stamp so as to enable further (such as statistical) evaluations and calculations on the server S, such as maintenance recommendations, residence time calculations (broken down by the individual operating areas) and the like.

In the preparation step, it is also possible to configure that certain shopping carts EKW may only be moved and used in specific operating areas. If this area is not complied with, a (silent, for example) alarm can be triggered, which is transmitted to an electronic monitoring device in the form of an optical and/or vibration signal.

Another application is the provision of a coinless transport unit dispenser. The transport units, and in particular shopping carts EKW, can then be removed from the parking box without a deposit. On return, which is automatically detected by way of electronic signaling, a reward can automatically be transmitted to the application A on the mobile device G. The reward can be a voucher or bonus points for the next shopping trip or an offer for a donation or monetary compensation.

It is thus also possible, for example, to automatically detect when the customer is behaving atypically compared to the normal payment process, for example when he or she does not approach the cash register, but remains standing in the self check-out area, an alarm can be automatically triggered.

All features described and shown in connection with individual embodiments of the invention can be provided in various combinations in the subject matter according to the invention so as to achieve the advantageous effects thereof simultaneously.

All method steps of the method can be implemented by electronic devices (circuits) suitable for carrying out the respective method step. Conversely, all the functions that are carried out by related features can be a method step of a method. For example, the method step "Generating instructions" can be implemented by an instruction building block, which has the described, appropriate functionality.

The scope of protection of the present invention is provided by the claims and is not limited by the features explained in the description or shown in the figures.

The invention claimed is:

1. An operating state measuring system for a plurality of shopping transport units moveable in different operating areas, wherein the operating state measuring system comprises:
    a plurality of transport units, each for use by a user, and each comprising an electronic transmitting unit;
    at least one receiving unit, which is positioned in the operating areas and adapted to receive signals from the electronic transmitting unit and to send a data packet to a central server, the data packet comprising position data of the transport unit;
    a plurality of beacons, which are positioned in the operating areas;
    an application, which is installed on a mobile device of the user and adapted to receive a bijective identification signal of a beacon, if the mobile device is located in an area surrounding the beacon, so as to then prompt transmission of a position signal to the central server, the position signal comprising position data of the mobile device; and the central server, which is adapted to receive and to evaluate the data packet comprising the position data of the transport unit and the position signal comprising the position data of the mobile device for calculation of a result data set, wherein the calculation comprises a comparison of the data packet associated with the transport unit and the position signal associated with the mobile device.

2. The operating state measuring system according to claim 1, wherein the electronic transmitting unit is an RFID tag, and the receiving unit is an RFID reader for exchanging electromagnetic signals.

3. The operating state measuring system according to claim 1, wherein the beacon transmits the bijective identification signal via a radio link.

4. The operating state measuring system according claim 1, wherein a plurality of parking boxes for storing the transport units is present in various operating areas.

5. The operating state measuring system according to claim 1, wherein the operating areas are located on different levels of a supermarket, the electronic transmitting unit to detect x, y and z coordinates.

6. The operating state measuring system according to claim 1, wherein the operating state measuring system measures a transport unit density in each of the operating areas.

7. A server, which is adapted to control an operating state measuring system according to claim 1, the server comprising:
an input interface, which is to receive the data packet from the receiving unit and the position signal;
a processor, which is to evaluate the received data and to generate a result data set; and
an output interface, which is to output or forward the result data set.

8. A method, carried out on a server, for controlling an operating state measuring system according to claim 1, the method comprising:
receiving a data packet from a receiving unit;
receiving a position signal;
evaluating the received data packet and the received position signal; and
generating a result data set from the evaluated data packet and position signal.

9. The method according to claim 8, wherein a transmission of the data packet from the receiving unit to the server is carried out in a time-controlled mode.

10. The method according to claim 8, wherein the evaluation includes a detection of a residence time of a transport unit in various operating areas.

11. The method according to claim 8, wherein only prefiltered data packets are sent to the server, which only includes revisions compared to previously transmitted data.

12. The method according to claim 8, wherein the result data set is to be output on a graphical user interface and/or on a mobile device.

13. The method according to claim 8, wherein the evaluation includes a data comparison between the respective received data packet and the position signal.

14. The method according to claim 8, wherein the evaluation includes an association between the respective transport unit and an application of a user operating the transport unit.

15. The operating state measuring system according to claim 1, wherein the plurality of transport units are shopping carts.

16. The operating state measuring system according to claim 3, wherein the radio link is Bluetooth or WLAN.

17. The operating state measuring system according to claim 5, wherein the parking boxes are located on different levels of a supermarket, the electronic transmitting unit to detect x, y and z coordinates.

18. The method according to claim 11, wherein the prefiltered data packets are a validity value, a time stamp and a revision data set.

19. The operating state measuring system according to claim 6, wherein the operating state measuring system measures a supply level of transport units of a respective parking box.

20. The operating state measuring system of claim 1, wherein receiving, by the central server, of the data packet comprising the position data of the transport unit, and receiving, by the central server, of the position signal comprising the position data of the mobile device, comprise two redundant position detection systems whereby either position detection system is used for evaluation by the central server in the event of a failure of the other position detection system.

* * * * *